US012684543B2

(12) United States Patent
Zhang et al.

(10) Patent No.: US 12,684,543 B2
(45) Date of Patent: Jul. 14, 2026

(54) METHOD AND APPARATUS FOR DETERMINING SLOT FORMATS OF UPLINK AND DOWNLINK TRANSMISSION

(71) Applicant: Lenovo (Beijing) Limited, Beijing (CN)

(72) Inventors: Yuantao Zhang, Beijing (CN); Hongmei Liu, Beijing (CN); Zhi Yan, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 330 days.

(21) Appl. No.: 18/569,763

(22) PCT Filed: Jul. 16, 2021

(86) PCT No.: PCT/CN2021/106759
§ 371 (c)(1),
(2) Date: Dec. 13, 2023

(87) PCT Pub. No.: WO2023/283931
PCT Pub. Date: Jan. 19, 2023

(65) Prior Publication Data
US 2024/0224246 A1 Jul. 4, 2024

(51) Int. Cl.
*H04W 72/0446* (2023.01)
*H04L 5/14* (2006.01)

(52) U.S. Cl.
CPC ........... *H04W 72/0446* (2013.01); *H04L 5/14* (2013.01)

(58) Field of Classification Search
CPC .... H04W 72/0446; H04L 5/14; H04L 5/0053; H04L 5/0094
See application file for complete search history.

(56) References Cited

U.S. PATENT DOCUMENTS

2016/0182212 A1* 6/2016 Zarifi ................ H04W 28/0236
                                                    370/336
2018/0132244 A1 5/2018 Huang et al.
2021/0051689 A1 2/2021 Takeda et al.
2022/0053550 A1* 2/2022 Li ............................. H04L 5/14
2022/0116968 A1* 4/2022 Choi ..................... H04L 5/0053
(Continued)

FOREIGN PATENT DOCUMENTS

CN      110809322 A    2/2020
CN      112514437 A    3/2021
(Continued)

OTHER PUBLICATIONS

PCT/CN2021/106759 , "International Preliminary Report on Patentability", PCT Application No. PCT/CN2021/106759, Jan. 25, 2024, 4 pages.
(Continued)

*Primary Examiner* — Michael K Phillips
(74) *Attorney, Agent, or Firm* — FIG. 1 Patents

(57) ABSTRACT

The present application relates to a method and an apparatus for determining slot formats of UL/DL transmission. The method includes: receiving a first UL/DL configuration and a second UL/DL configuration: and determining slot formats for a set of non-flexible slots and non-flexible symbols by at least one of the first UL/DL configuration and the second UL/DL configuration.

20 Claims, 12 Drawing Sheets

900

(56)                    References Cited

U.S. PATENT DOCUMENTS

| 2022/0399984 | A1* | 12/2022 | Luo | H04L 5/14 |
| 2023/0156798 | A1* | 5/2023 | Wang | H04W 74/0841 |
| | | | | 370/329 |
| 2024/0080811 | A1* | 3/2024 | Wang | H04L 5/0048 |

FOREIGN PATENT DOCUMENTS

| WO | 2020013954 | A1 | 1/2020 |
| WO | 2020145867 | A1 | 7/2020 |

OTHER PUBLICATIONS

PCT/CN2021/106759 , "International Search Report and Written Opinion", PCT Application No. PCT/CN2021/106759, Mar. 28, 2022, 6 pages.

ZTE , et al., "Summary of offline discussion on the Intended DL/UL configuration Definition", 3GPP TSG-RAN3 Meeting #103b, R3-192089, Xi'an, China, Apr. 2019, 7 pages.

* cited by examiner

Figure 5:
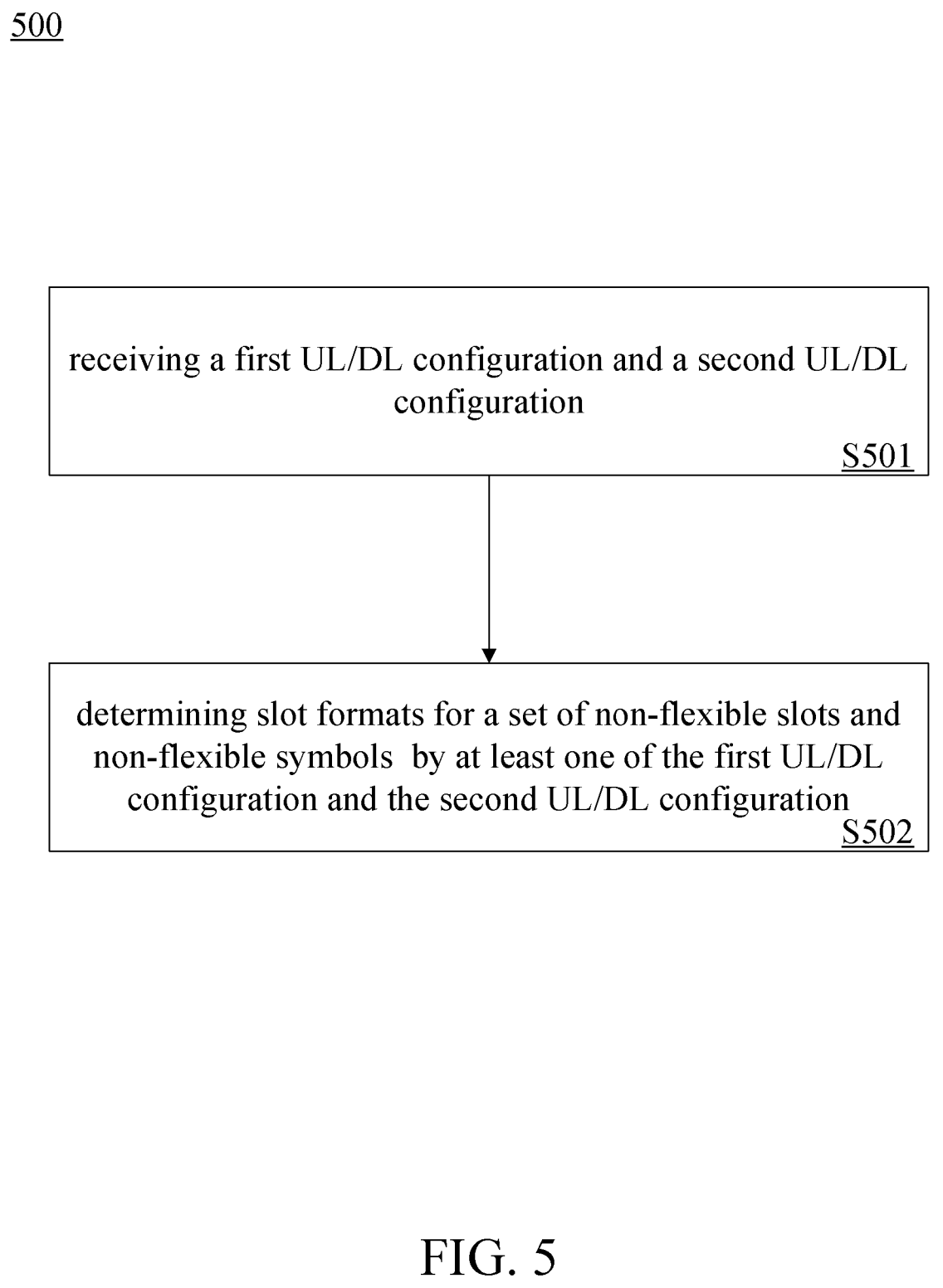

500

```
┌──────────────────────────────────────────────────┐
│                                                    │
│  receiving a first UL/DL configuration and a       │
│  second UL/DL configuration                        │
│                                                    │
│                                          S501      │
└──────────────────────────────────────────────────┘
                        │
                        ▼
┌──────────────────────────────────────────────────┐
│                                                    │
│  determining slot formats for a set of non-flexible│
│  slots and non-flexible symbols  by at least one   │
│  of the first UL/DL configuration and the second   │
│  UL/DL configuration                               │
│                                          S502      │
└──────────────────────────────────────────────────┘
```

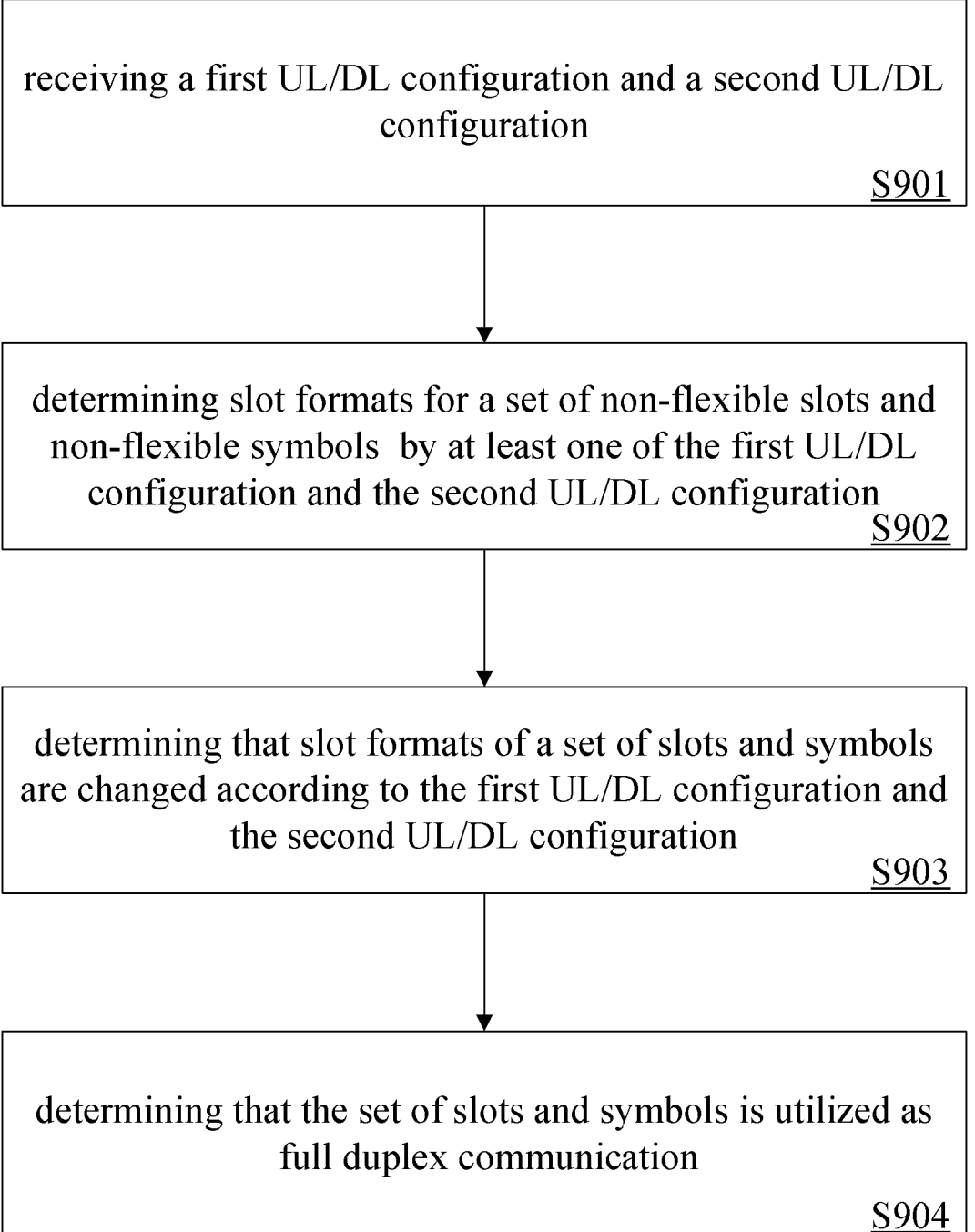

receiving a first UL/DL configuration and a second UL/DL configuration

S901 determining slot formats for a set of non-flexible slots and non-flexible symbols by at least one of the first UL/DL configuration and the second UL/DL configuration

S902 determining that slot formats of a set of slots and symbols are changed according to the first UL/DL configuration and the second UL/DL configuration

S903 determining that the set of slots and symbols is utilized as full duplex communication

METHOD AND APPARATUS FOR DETERMINING SLOT FORMATS OF UPLINK AND DOWNLINK TRANSMISSION

TECHNICAL FIELD

Embodiments of the present application generally relate to wireless communication technology, especially to a method and an apparatus for determining slot formats of uplink and/or downlink transmission under 3GPP (3rd Generation Partnership Project) 5G new radio (NR).

BACKGROUND

When full duplex operation is supported by the base station, the base station can utilize the cell specific configuration (e.g., of configuration tdd-ul-dl-ConfigCommon defined in 3GPP specification) indicating flexible symbol(s) and utilize user equipment specific configuration(s) to indicate different transmission direction(s) for the flexible symbol(s) for different user equipment(s). However, it may impact the behaviour of the legacy user equipment in the network in terms of slot formats determination and data scheduling, and may cause more power consumption at user equipment side.

SUMMARY

Some embodiments of the present application provide a method of a user equipment. The method includes: receiving a first uplink and downlink (UL/DL) configuration and a second UL/DL configuration; and determining slot formats for a set of non-flexible slots and non-flexible symbols by at least one of the first UL/DL configuration and the second UL/DL configuration.

Some embodiments of the present application provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 5 illustrates a flow chart of a method for wireless communications according to an embodiment of the present disclosure.

FIG. 9 illustrates a flow chart of a method for wireless communications according to an embodiment of the present disclosure.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), etc. It is contemplated that along with the 3GPP and related communication technology development, the terminologies recited in the present application may change, which should not affect the principle of the present application.

Figure 1:
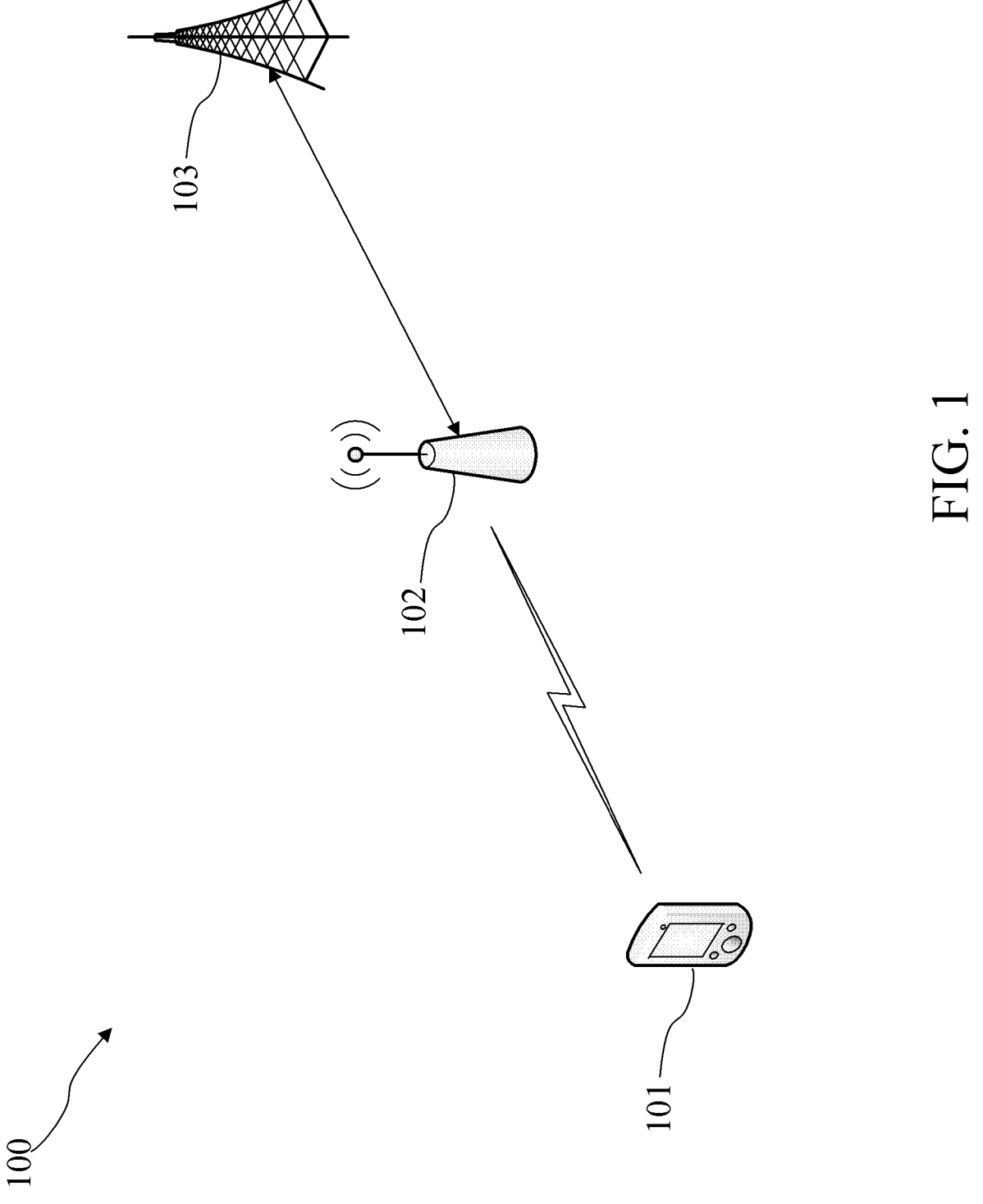
FIG. 1 illustrates a schematic diagram of a wireless communication system in accordance with some embodiments of the present application.

Referring to FIG. 1, a wireless communication system 100 may include a user equipment (UE) 101, a base station (BS) 102 and a core network (CN) 103. Although a specific number of the UE 101, the BS 102 and the CN 103 are depicted in FIG. 1, it is contemplated that any number of the UEs 101, the BSs 102 and the CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which communicatively coupled with the AMF entity.

The BS 102 may be distributed over a geographic region. In certain embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with the BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the 5G NR-light (or reduced capability NR UEs) of the 3GPP protocol, wherein the BS 102 transmits data using an OFDM modulation scheme on the downlink (DL) and the UE 101 transmits data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the UE 101 and BS 102 may communicate using other communication protocols, such as the IEEE 802.11 family of wireless communication protocols. Further, in some embodiments of the present application, the UE 101 and BS 102 may communicate over licensed spectrums, whereas in other embodiments, the UE 101 and the BS 102 may communicate over unlicensed spectrums. The present application is not intended to be limited to the implementation of any particular wireless communication system architecture or protocol.

In yet some embodiments of present application, the BS 102 may communicate with the UE 101 using the 3GPP 5G protocols.

According to existing agreements, full duplex operation is supported by the BS 102, which means the BS 102 has the capability of simultaneous transmission and reception on a same carrier. The BS 102 may utilize a cell specific configuration (e.g., configuration of tdd-ul-dl-ConfigCommon defined in 3GPP specification) indicating flexible symbol(s) and utilize UE specific configuration(s) to indicate different transmission direction(s) for the flexible symbol(s) for different UE(s). Therefore, different UEs might have different transmission directions in these symbols, and the BS 102 needs to transmit and receive simultaneously in these symbols. However, it may impact the behaviour of the legacy UEs in the network in terms of slot formats determination and data scheduling, and may cause more power consumption at UE side. Here the flexible symbols mean that, for these symbols, the UE cannot make any assumption on the transmission direction.

Accordingly, in the present disclosure, the UE 101 supporting full duplex of the BS 102 side may determine slot formats under less behaviour impact and cause less power consumption. A slot format might include downlink symbols, uplink symbols, flexible symbols, and full duplex symbols. More details on embodiments of the present disclosure will be further described hereinafter.

Figure 2:
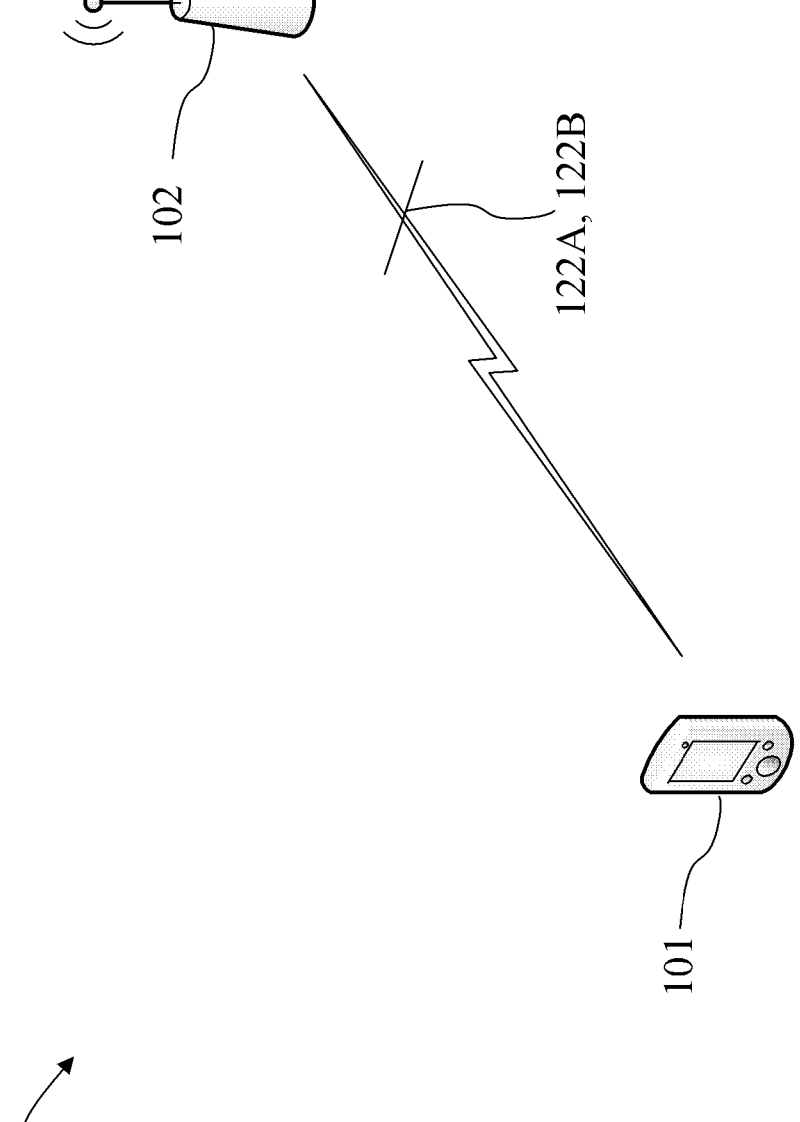
FIG. 2 illustrates a schematic diagram of message transmission in accordance with some embodiments of the present application.

FIG. 2 is a schematic diagram of message transmission in accordance with some embodiments of the present application. In some embodiments, the BS 102 may transmit a first uplink and downlink (UL/DL) configuration 122A and a second UL/DL configuration 122B. The UE 101 may receive the first UL/DL configuration 122A and the second UL/DL configuration 122B.

Then, the UE 102 may determine slot formats for a set of non-flexible slots and non-flexible symbols by at least one of the first UL/DL configuration 122A and the second UL/DL configuration 122B. It should be noted that the set of non-flexible slots and non-flexible symbols may include at least one non-flexible slot and/or at least one non-flexible symbol. Here a non-flexible slot is either a DL slot or a UL slot, i.e., it contains only non-flexible OFDM symbols, and a non-flexible symbol is either a DL OFDM symbol or a UL OFDM symbol.

Figure 3A:
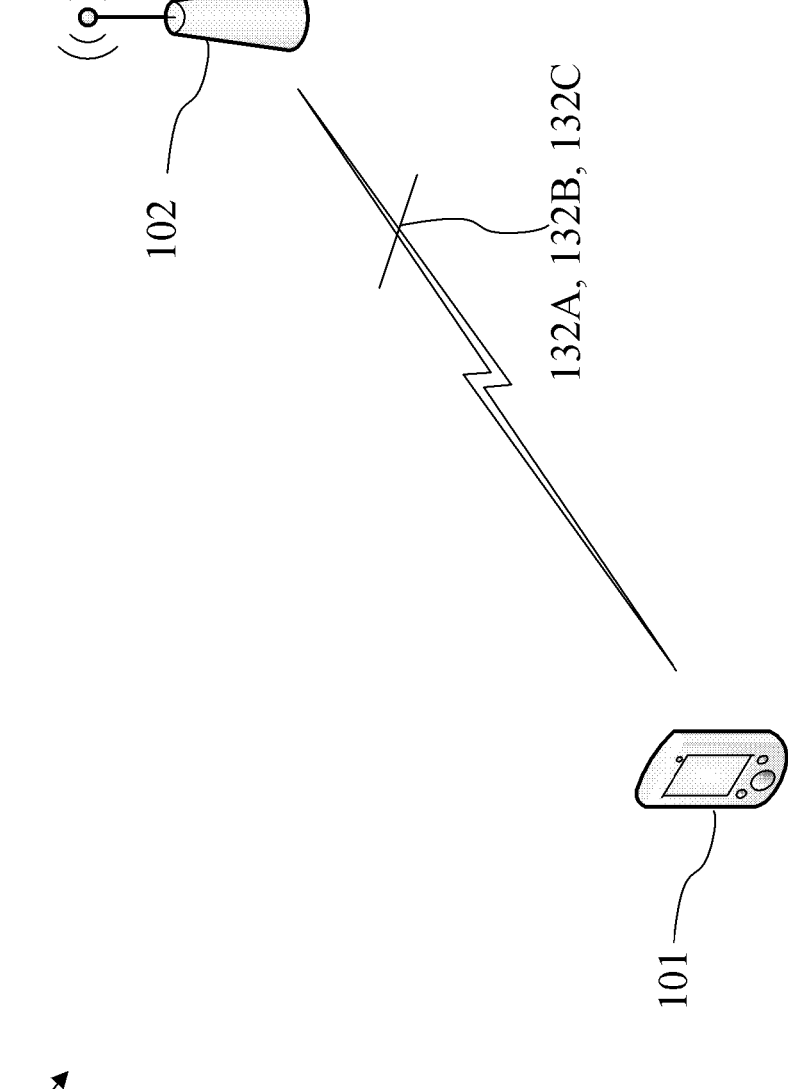
FIG. 3A illustrates a schematic diagram of message transmission in accordance with some embodiments of the present application.

FIG. 3A is a schematic diagram of message transmission in accordance with some embodiments of the present application. In some embodiments, the BS 102 may transmit a first UL/DL configuration 132A. The first UL/DL configuration 132A may include a cell common UL/DL configuration (e.g., configuration of tdd-ul-dl-ConfigCommon defined in 3GPP specification). The BS 102 may then transmit a second UL/DL configuration 132B. The second UL/DL configuration 132B may include a UE specific UL/DL configuration (e.g., configuration of tdd-UL-DL-ConfigDedicated defined in 3GPP specification, or a UE specific physical layer or medium access control (MAC) signaling) for the UE 101. The UE 101 may receive the first UL/DL configuration 132A and receive the second UL/DL configuration 132B after receiving the first UL/DL configuration 132A.

In some embodiments, the BS 102 may transmit at least one configuration 132C to the UE 101. The UE 101 may receive the at least one configuration 132C. The at least one configuration 132C may be transmitted in a system information block (e.g., SIB1 or other SIBs) or may be transmitted in a UE specific signalling.

When the UE 101 supports full duplex of the BS 102 side, the UE 101 may be capable of interpreting the at least one configuration 132C (i.e., a function associated with the at least one configuration 132C is enabled at the UE 101 side). Then, the UE 101 may determine whether the at least one configuration 132C is positive or negative. Then, according to the at least one configuration 132C, the UE 101 may determine the slot formats for the set of non-flexible slots and non-flexible symbols by at least one of the first UL/DL configuration 132A and the second UL/DL configuration 132B.

In some implementations, when the at least one configuration 132C is determined positive (e.g., the value of the at least one configuration 132C is '1'), the UE 101 may determine the slot formats for the set of non-flexible slots and non-flexible symbols by both the first UL/DL configuration 132A and the second UL/DL configuration 132B. In detail, the UE 101 may determine the slot formats by the first UL/DL configuration 132A, and then may change (or override) the slot formats for the set of non-flexible slots and non-flexible symbols by the second UL/DL configuration 132B.

For example, the first UL/DL configuration 132A includes slot format parameters: DL/UL transmission periodicity (e.g., of parameter dl-ul-TransmissionPeiodicity defined in 3GPP specification), number of DL slots (e.g., parameter of nrofDownlinkSlots defined in 3GPP specification), number of UL slots (e.g., parameter of nrofUplinkSlots defined in 3GPP specification), number of DL symbols (e.g., parameter of nrofDownlinkSymbols defined in 3GPP specification) and number of UL symbols (e.g., parameter of nrofUplinkSymbols defined in 3GPP specification).

Figure 3B:
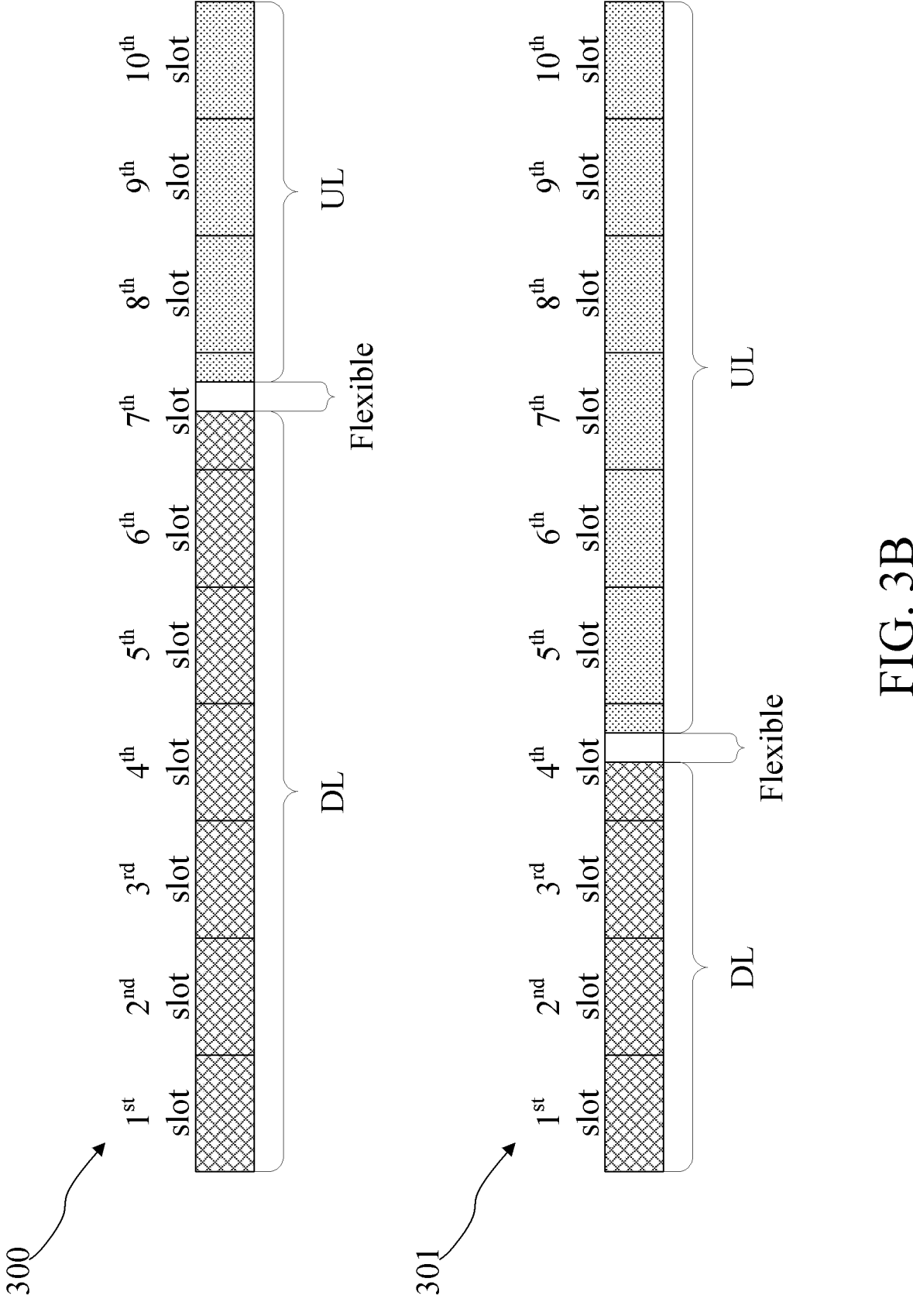
FIG. 3B illustrate a schematic diagram of slot formats in accordance with some embodiments of the present application.

When the DL/UL transmission periodicity is '5', number of DL slots is '6,' number of UL slots is '3', number of DL symbols is '7' and number of UL symbols is '3', the UE 101 determines the slot formats 300 illustrated in FIG. 3B. In detail, the slot formats 300 has periodicity of 5 millisecond which includes 10 slots under 30 KHz subcarrier spacing. The first six slots are for DL and the last three slots are for UL. There is one slot between the slots for DL and the slots for UL. The first seven symbols of the one slot are for DL and the last three symbols of the one slot are for UL. The symbols between the symbols for DL and the symbols for UL are for flexible usage or used as guard period for DL to UL transition.

The second UL/DL configuration 132B includes slot format parameter indicating that the slot formats of the fifth and sixth slots, which are non-flexible slots (DL slots) in the slot formats 300, need to be changed. Accordingly, the UE 101 changes the slot formats 300 to the slot formats 301 for the set of non-flexible slots and non-flexible symbols. More specifically, in the slot formats 301, the slot formats of the fifth and sixth slots are changed from DL to UL. The UE 101 utilizes the slot formats 301 for the data communication. In some embodiments, the determined slot formats 301 may be utilized by UE 101 after initial access, while the slot formats 300 is utilized by UE 101 during initial access. As one embodiment, whether slot formats 301 is utilized during initial access is based on a configuration.

In some implementations, when the at least one configuration 132C is determined negative (e.g., the value of the at least one configuration 132C is '0'), the UE 101 may determine the slot formats for the set of non-flexible slots and non-flexible symbols by the first UL/DL configuration 132A. In detail, the UE 101 may determine the slot formats by the first UL/DL configuration 132A only.

For example, the first UL/DL configuration 132A includes slot format parameters: DL/UL transmission periodicity (e.g., parameter of dl-ul-TransmissionPeiodicity defined in 3GPP specification), number of DL slots (e.g., parameter of nrofDownlinkSlots defined in 3GPP specification), number of UL slots (e.g., parameter of nroftplinkSlots defined in 3GPP specification), number of DL symbols (e.g., parameter of nrofDownlinkSymbols defined in 3GPP specification) and number of UL symbols (e.g., parameter of nrofUplinkSymbols defined in 3GPP specification). When the DL/UL transmission periodicity is '5', number of DL slots is '6,' number of UL slots is '3', number of DL symbols is '7' and number of UL symbols is '3', the UE 101 determines the slot formats 300 illustrated in FIG. 3B. The UE 101 utilizes the slot formats 300 for the data communication.

In some embodiments, when the at least one configuration 132C is not configured to the UE 101, the UE 101 has a default value of the at least one configuration 132C, which could be either a positive value or a negative value.

In some embodiments, the second UL/DL configuration may be the UE specific UL/DL configuration by a radio resource control (RRC) signalling or the UE specific UL/DL configuration by a downlink control information (DCI) signalling, or the UE specific UL/DL configuration by a MAC signalling. The at least one configuration 132C may be utilized for all the UE specific UL/DL configurations. In some embodiments, the at least one configuration 132C may include a configuration utilized for the UE specific UL/DL configuration by a RRC signalling and another configuration utilized for the UE specific UL/DL configuration by a DCI and another configuration utilized for the UE specific UL/DL configuration by a MAC signalling.

In some embodiments, when the UE 101 does not support full duplex of the BS 102 side, the UE 101 may not be capable of interpreting the at least one configuration 132C (i.e., the function associated with the at least one configuration 132C is not enabled at the UE 101 side). Then, the UE 101 may determine the slot formats for the set of non-flexible slots and non-flexible symbols by only the first UL/DL configuration 132A, which means that the UE 101 determines the slot formats 300 illustrated in FIG. 3B. The UE 101 utilizes the slot formats 300 for the data communication.

In some embodiments, the at least one configuration 132C may be applicable to one or more frequency subbands or bandwidth parts. For different frequency band or bandwidth part, the at least one configuration 132C may be same or different. In some embodiments, the second configuration 132B may be different for different frequency subbands or bandwidth parts.

In some embodiments, when the UE 101 supports full duplex (which naturally needs BS supporting full duplex as well), the UE 101 determines that the slots or symbols that have different slot formats in the first UL/DL configuration and in the second UL/DL configuration are for full duplex communication or for bi-direction communication. For example, a slot or a symbol that is configured as DL in the first UL/DL configuration and is configured as UL or flexible in the second UL/DL configuration is for full duplex communication, or a slot that is configured as UL in the first UL/DL configuration and is configured as DL or flexible in the second UL/DL configuration is for full duplex communication. Specifically, the UE 101 may determine that the slot formats of a set of slots and symbols is changed according to the first UL/DL configuration 132A and the second UL/DL configuration 132B. Then, the UE 101 may determine that the set of slots and symbols is utilized as full duplex communication, or bi-direction communication. In some embodiments, whether the slots or symbols that have different transmission directions in the first UL/DL configuration and in the second UL/DL configuration are for full duplex communication is based on a configuration. If the configuration indicates that these slots are not for full duplex communication, they may follow the slot formats configured by a predefined configuration, which is either the first UL/DL configuration or the second UL/DL configuration.

For example, regarding the slot formats 300 and 301 determined according to the first UL/DL configuration 132A and the second UL/DL configuration 132B, the UE 101 determines the set of the fifth slot and the sixth slot is changed from DL to UL. Then, the UE 101 determines that the set of the fifth slot and the sixth slot is utilized as full duplex communication at both the BS 102 side and UE 101 side.

In some embodiments, the BS 102 may transmit a bitmap configuration (not shown) to the UE 101. The UE 101 may receive the bitmap configuration. The UE 101 may determine that at least one element of the set of slots and symbols is utilized as full duplex communication according to the bitmap configuration.

For example, regarding the set of [fifth slot, sixth slot] is utilized as full duplex communication at the UE 101 side, the bitmap configuration [1, 0] further indicates that the fifth slot is utilized as full duplex communication and the sixth slot is not utilized as full duplex communication.

Figure 4A:
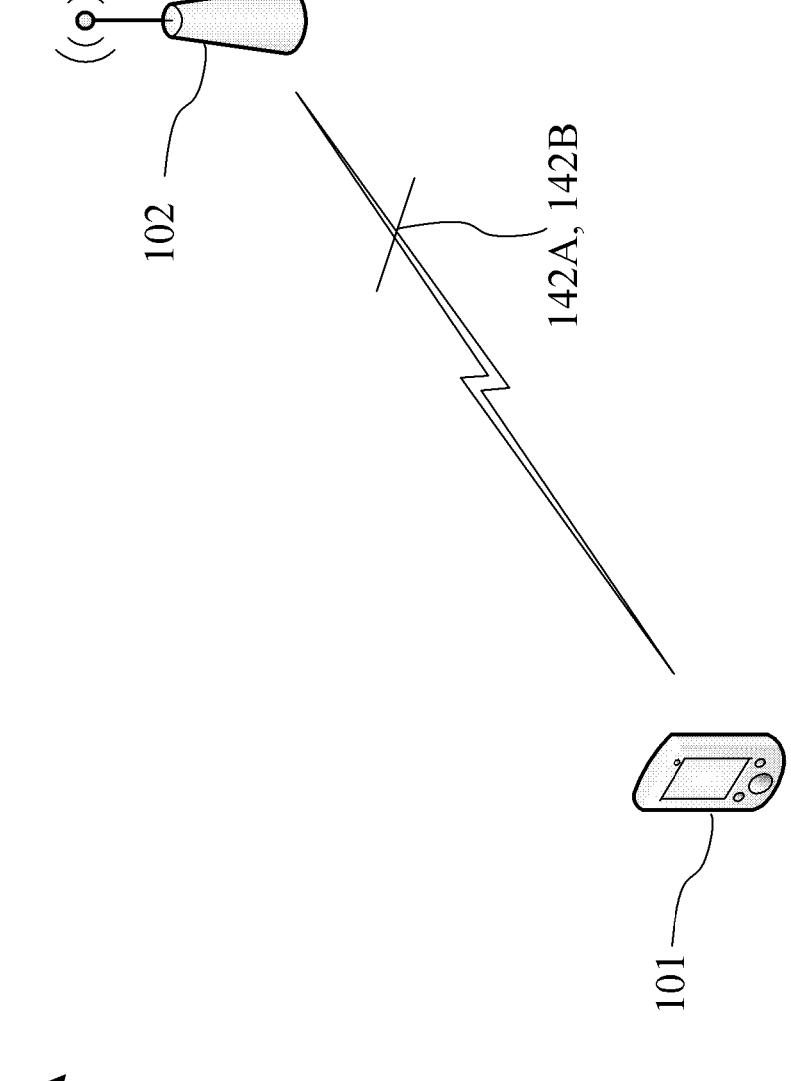
FIG. 4A illustrates a schematic diagram of message transmission in accordance with some embodiments of the present application.

FIG. 4A is a schematic diagram of message transmission in accordance with some embodiments of the present application. In some embodiments, the BS 102 may transmit a first UL/DL configuration 142A and a second configuration 142B in the same message or in the different messages. The first UL/DL configuration 142A may include a cell common UL/DL configuration (e.g., configuration of tdd-ul-dl-ConfigCommon defined in 3GPP specification) and the second UL/DL configuration 142B may include another cell common UL/DL configuration. The UE 101 may receive the first UL/DL configuration 142A and the second UL/DL configuration 142B in the same message or in the different messages.

In some embodiments, the first UL/DL configuration 142A and the second UL/DL configuration 142B may have a same format. When the UE 101 supports full duplex of the BS 102 side, the UE 101 may be capable of interpreting the second UL/DL configuration 142B (i.e., a function associated with the the second UL/DL configuration 142B is enabled at the UE 101 side). Then, the UE 101 may determine the slot formats for a set of non-flexible slots and non-flexible symbols by the second UL/DL configuration 142B. In some implementations, at least one configuration of the second UL/DL configuration 142B may be different from corresponding configuration of the first UL/DL configuration 142A.

For example, the first UL/DL configuration 142A includes slot format parameters: first DL/UL transmission periodicity (e.g., parameter of dl-ul-TransmissionPeiodicity defined in 3GPP specification), first number of DL slots (e.g., parameter of nrofDownlinkSlots defined in 3GPP specification), first number of UL slots (e.g., parameter of nrofUplinkSlots defined in 3GPP specification), first number of DL symbols (e.g., parameter of nrofDownlinkSymbols defined in 3GPP specification) and first number of UL symbols (e.g., parameter of nrofUplinkSymbols defined in 3GPP specification).

The second UL/DL configuration 142A includes slot format parameters: second DL/UL transmission periodicity (e.g., parameter of dl-ul-TransmissionPeiodicity defined in 3GPP specification), second number of DL slots (e.g., parameter of nrofDownlinkSlots defined in 3GPP specification), second number of UL slots (e.g., parameter of nrofUplinkSlots defined in 3GPP specification), second number of DL symbols (e.g., parameter of nrofDownlinkSymbols defined in 3GPP specification) and second number of UL symbols (e.g., parameter of nrofUplinkSymbols defined in 3GPP specification). In some embodiments, the second UL/DL configuration contains only the configurations that are different with those in the first UL/DL configuration.

Figure 4B:
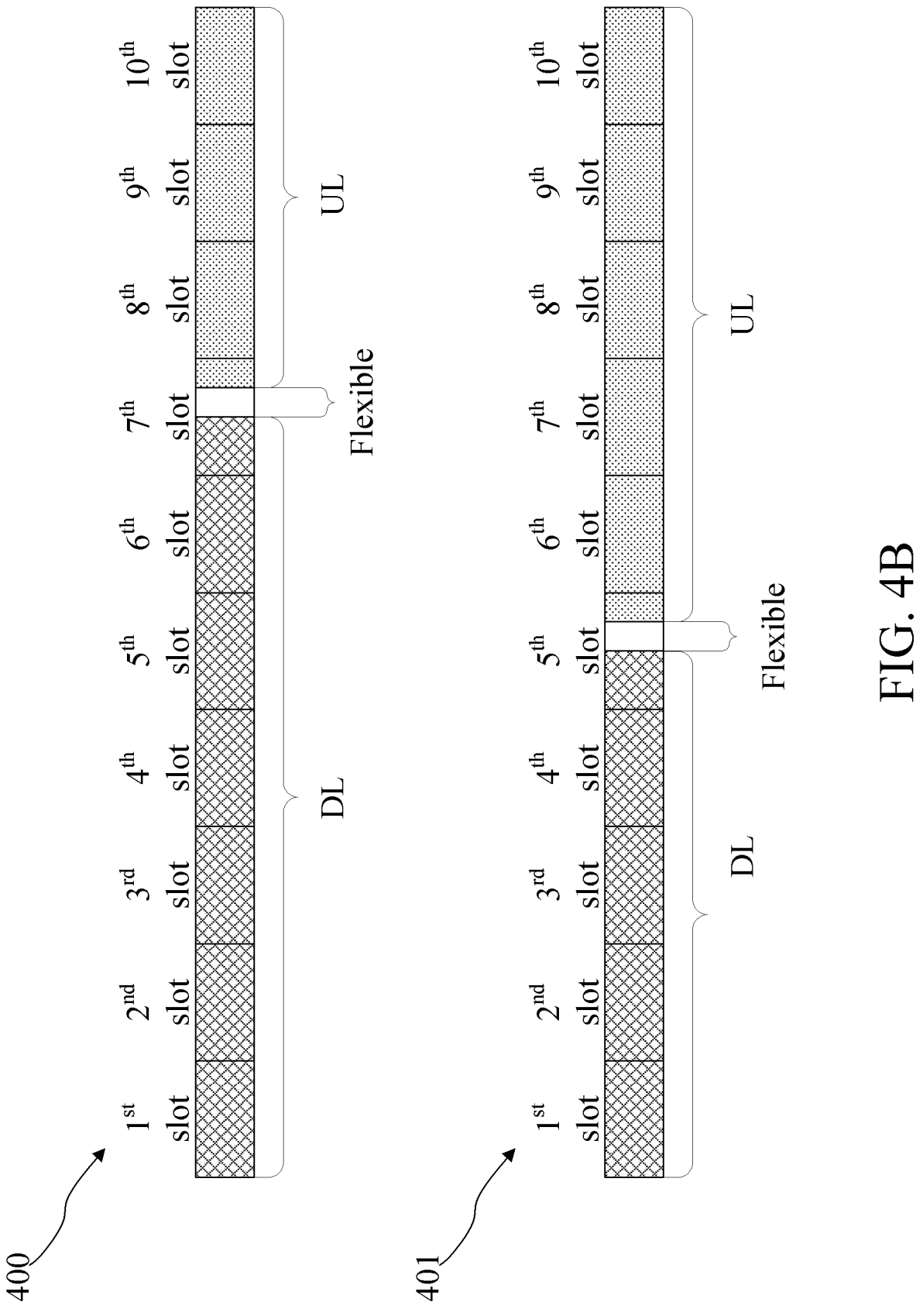
FIG. 4B illustrate a schematic diagram of slot formats in accordance with some embodiments of the present application.

When the first DL/UL transmission periodicity is '5', number of DL slots is '6,' the first number of UL slots is '3', the first number of DL symbols is '7' and the first number of UL symbols is '3', the UE 101 determines the slot formats 400 illustrated in FIG. 4B. When the second DL/UL transmission periodicity is '5', the second number of DL slots is '4,' the second number of UL slots is '5', the second number of DL symbols is '7' and the second number of UL symbols is '3', the UE 101 determines the slot formats 401 illustrated in FIG. 4B. Because the function associated with the second UL/DL configuration 142B is enabled at the UE 101 side, the UE 101 utilizes the slot formats 401 for the data communication. In some embodiments, the determined slot formats 401 may be utilized after initial access for UE 101, while the slot formats 400 are utilized during initial access for UE 101. As one embodiment, whether slot formats 401 is utilized during initial access is based on a configuration.

In some embodiments, the first UL/DL configuration 142A and the second UL/DL configuration 142B may have different formats. The first UL/DL configuration 142A may have a format of the normal cell common UL/DL configuration. The second UL/DL configuration 142B may have a new format based on the normal cell common UL/DL configuration, while the new format indicates the slot formats change for a subset of slots/symbols. For example, changed from DL to UL or flexible, or from UL to DL or flexible.

When the UE 101 supports full duplex of the BS 102 side, the UE 101 may be capable of interpreting the second UL/DL configuration 142B (i.e., the function associated with the second UL/DL configuration 142B is enabled at the UE 101 side). Then, the UE 101 may determine the slot formats for a set of non-flexible slots and non-flexible symbols by the first UL/DL configuration 142A, and may change (or override) the slot formats for the set of non-flexible slots and non-flexible symbols by the second UL/DL configuration 142B.

For example, the first UL/DL configuration 142A includes slot format parameters: DL/UL transmission periodicity (e.g., parameter of dl-ul-TransmissionPeiodicity defined in 3GPP specification), number of DL slots (e.g., parameter of nrofDownlinkSlots defined in 3GPP specification), number of UL slots (e.g., parameter of nrofUplinkSlots defined in 3GPP specification), number of DL symbols (e.g., parameter of nrofDownlinkSymbols defined in 3GPP specification) and number of UL symbols (e.g., parameter of nrofUplinkSymbols defined in 3GPP specification).

When the DL/UL transmission periodicity is '5', number of DL slots is '6,' number of UL slots is '3', number of DL symbols is '7' and number of UL symbols is '3', the UE 101 determines the slot formats 400 illustrated in FIG. 4B.

The second UL/DL configuration 142B includes slot format parameter indicating that the slot format of the sixth slot, which is non-flexible slot (DL slot) in the slot formats 400, need to be changed from DL to UL. Accordingly, the UE 101 changes the slot formats 400 to the slot formats 401 for the set of non-flexible slots and non-flexible symbols.

More specifically, in the slot formats 401, the slot format of the sixth slot is changed from DL to UL. The UE 101 utilizes the slot formats 401 for the data communication. In some embodiments, the determined slot formats 401 may be utilized after initial access, while the slot formats 400 are utilized during initial access for UE 101. As one embodiment, whether slot formats 401 is utilized during initial access is based on a configuration.

In some embodiments, when the UE 101 does not support full duplex of the BS 102 side, the UE 101 may not be capable of interpreting the second UL/DL configuration 142B (i.e., the function associated with the second UL/DL configuration 142B is not enabled at the UE 101 side). Then, the UE 101 may determine the slot formats for the set of non-flexible slots and non-flexible symbols by only the first UL/DL configuration 142A, which means that the UE 101 determines the slot formats 400 illustrated in FIG. 4B. The UE 101 utilizes the slot formats 400 for the data communication.

In some embodiments, when the UE 101 supports full duplex (which naturally needs BS support full duplex as well), the UE 101 determines that the slots or symbols that have different slot formats in the first UL/DL configuration and in the second UL/DL configuration are for full duplex communication or for bi-direction communication. For example, a slot or a symbol that is configured as DL in the first UL/DL configuration and is configured as UL or flexible in the second UL/DL configuration is for full duplex communication, or a slot that is configured as UL in the first UL/DL configuration and is configured as DL or flexible in the second UL/DL configuration is for full duplex communication. Specifically, the UE 101 may determine that slot formats of a set of slots and symbols of the slot formats is changed according to the first UL/DL configuration 142A and the second UL/DL configuration 142B. Then, the UE 101 may determine that the set of slot and symbol is utilized as full duplex communication, or bi-direction communication. In some embodiments, whether the slots or symbols that have different slot formats in the first UL/DL configuration and in the second UL/DL configuration are for full duplex communication is based on a configuration. If the configuration indicates that these slots are not for full duplex communication, they may follow the slot formats configured by a predefined configuration, which is either the first UL/DL configuration or the second UL/DL configuration.

For example, regarding the slot formats 400 and 401 determined according to the first UL/DL configuration 142A and the second UL/DL configuration 142B, the UE 101 determines the set of the sixth slot is changed from DL to UL. Then, the UE 101 determines that the set of the sixth slot is utilized as full duplex communication at the UE 101 side and also BS 102 side.

In some embodiments, the second configuration 142B may be different for different for different frequency sub-band or bandwidth part.

In some embodiments, the BS 102 may transmit a bitmap configuration (not shown) to the UE 101. The UE 101 may receive the bitmap configuration. The UE 101 may determine that at least one element of the set of slots and symbols is utilized as full duplex communication according to the bitmap configuration.

For example, regarding the set of [sixth slot] is utilized as bi-direction communication at the BS 102 side, the bitmap configuration [1] further indicates that the sixth slot is utilized as full duplex communication and the bitmap configuration [0] further indicates that the sixth slot is not utilized as full duplex communication.

In some embodiments, the UE 101 uses slot formats determined for full duplex (either in BS side only or in both BS and UE side) only after initial access. The UEs 101 uses slot format determined for non-full duplex during initial access.

FIG. 5 illustrates a flow chart of a method for wireless communications in accordance with some embodiments of the present application. Referring to FIG. 5, method 500 is performed by a UE (e.g., the UE 101) in some embodiments of the present application.

In some embodiments, operation S501 is executed to receive, by the UE, a first UL/DL configuration and a second UL/DL configuration. Operation S502 is executed to determine, by the UE, slot formats for a set of non-flexible slots and non-flexible symbols by at least one of the first UL/DL configuration and the second UL/DL configuration.

Figure 6:
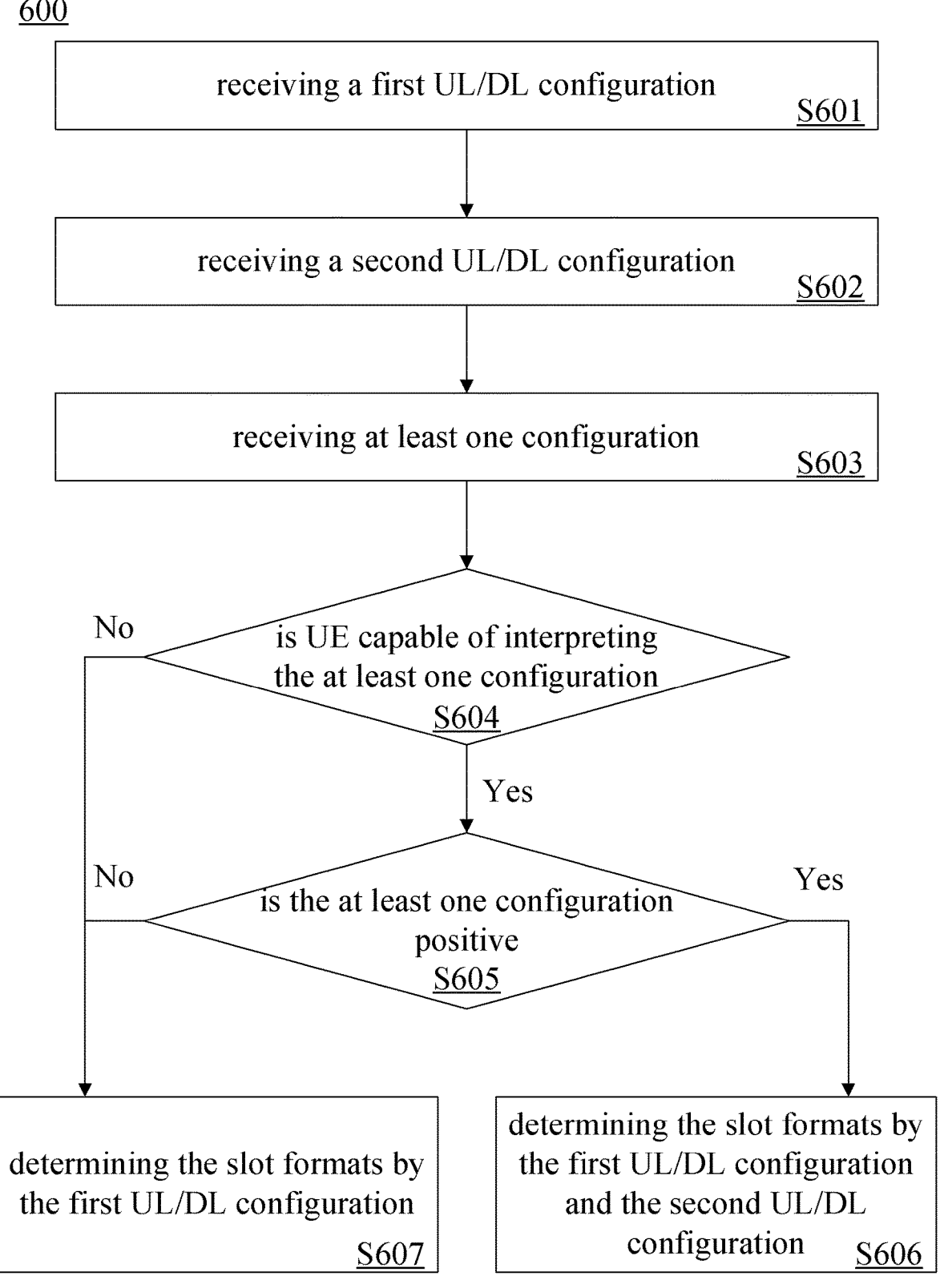
FIG. 6 illustrates a flow chart of a method for wireless communications according to an embodiment of the present disclosure.

FIG. 6 illustrates a flow chart of a method for wireless communications in accordance with some embodiments of the present application. Referring to FIG. 6, method 600 is performed by a UE (e.g., the UE 101) in some embodiments of the present application.

In some embodiments, operation S601 is executed to receive, by the UE, a first UL/DL configuration. The first UL/DL configuration may include a cell common UL/DL configuration. Operation S602 is executed to receive, by the UE, a second UL/DL configuration. The second UL/DL configuration may include a UE specific UL/DL configuration. Operation S603 is executed to receive, by the UE, at least one configuration.

Operation S604 is executed to determine, by the UE, whether the UE is capable of interpreting the at least one configuration. If yes, Operation S605 is executed to determine, by the UE, whether the at least one configuration is positive. If the at least one configuration is determined positive, operation S606 is executed to determine, by the UE, the slot formats by the first UL/DL configuration and the second UL/DL configuration. If it is determined 'no' in operations S604 or S605, operation S607 is executed to determine, by the UE, the slot formats by the first UL/DL configuration.

In some embodiments, operation S606 may include two sub-operations: determining the slot formats by the first UL/DL configuration; and changing the slot formats for the set of non-flexible slots and non-flexible symbols by second UL/DL configuration.

Figure 7:
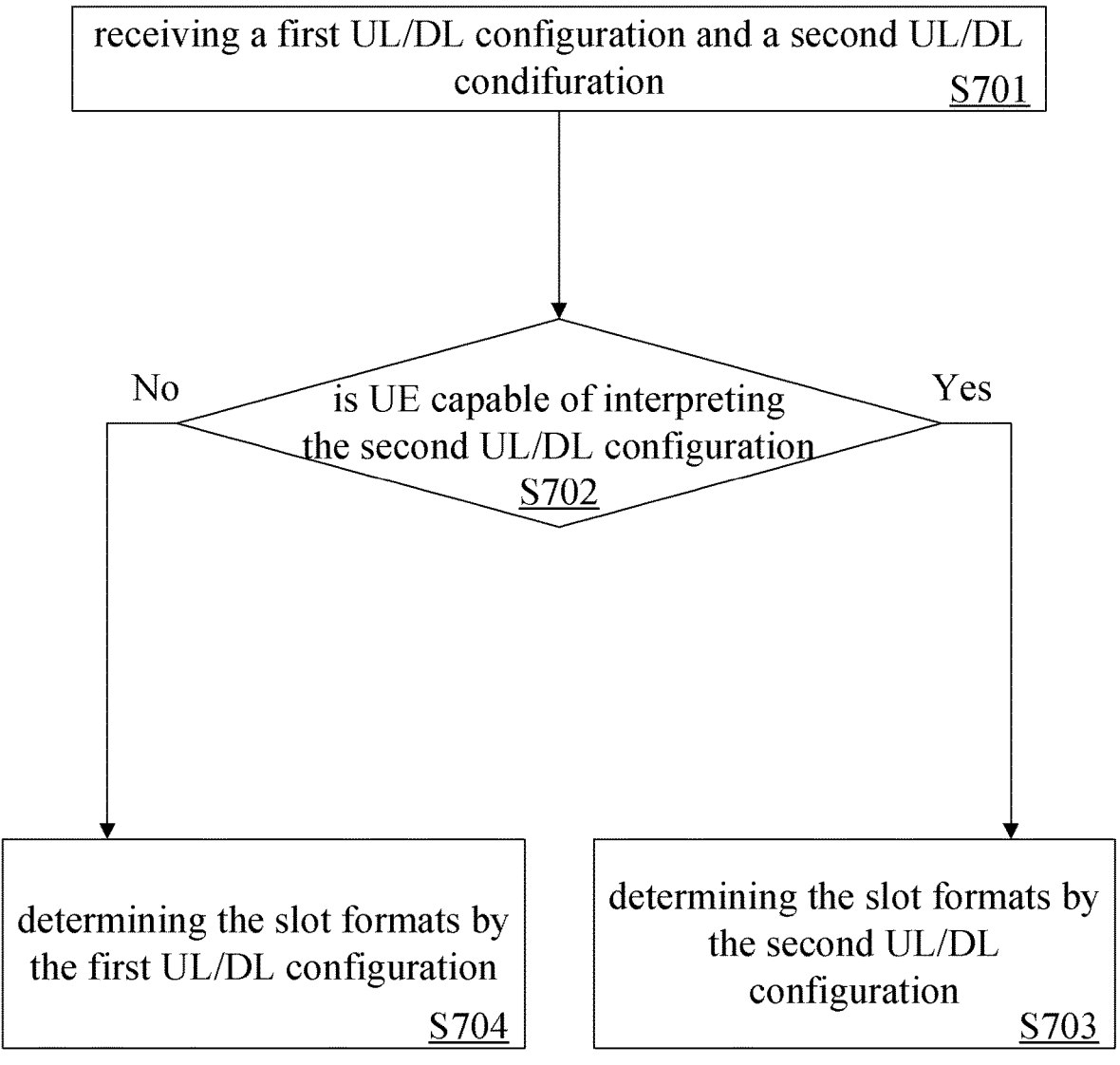
FIG. 7 illustrates a flow chart of a method for wireless communications according to an embodiment of the present disclosure.

FIG. 7 illustrates a flow chart of a method for wireless communications in accordance with some embodiments of the present application. Referring to FIG. 7, method 700 is performed by a UE (e.g., the UE 101) in some embodiments of the present application.

In some embodiments, operation S701 is executed to receive, by the UE, a first UL/DL configuration and a second UL/DL configuration. The first UL/DL configuration may include a cell common UL/DL configuration. The second UL/DL configuration may include another cell common UL/DL configuration. The first UL/DL configuration and the second UL/DL configuration may have the same format.

Operation S702 is executed to determine, by the UE, whether the UE is capable of interpreting the second UL/DL configuration. If it is determined 'yes' in operation S702, Operation S703 is executed to determine, by the UE, the slot formats by the second UL/DL configuration. If it is determined 'no' in operation S702, Operation S704 is executed to determine, by the UE, the slot formats by the first UL/DL configuration.

Figure 8:
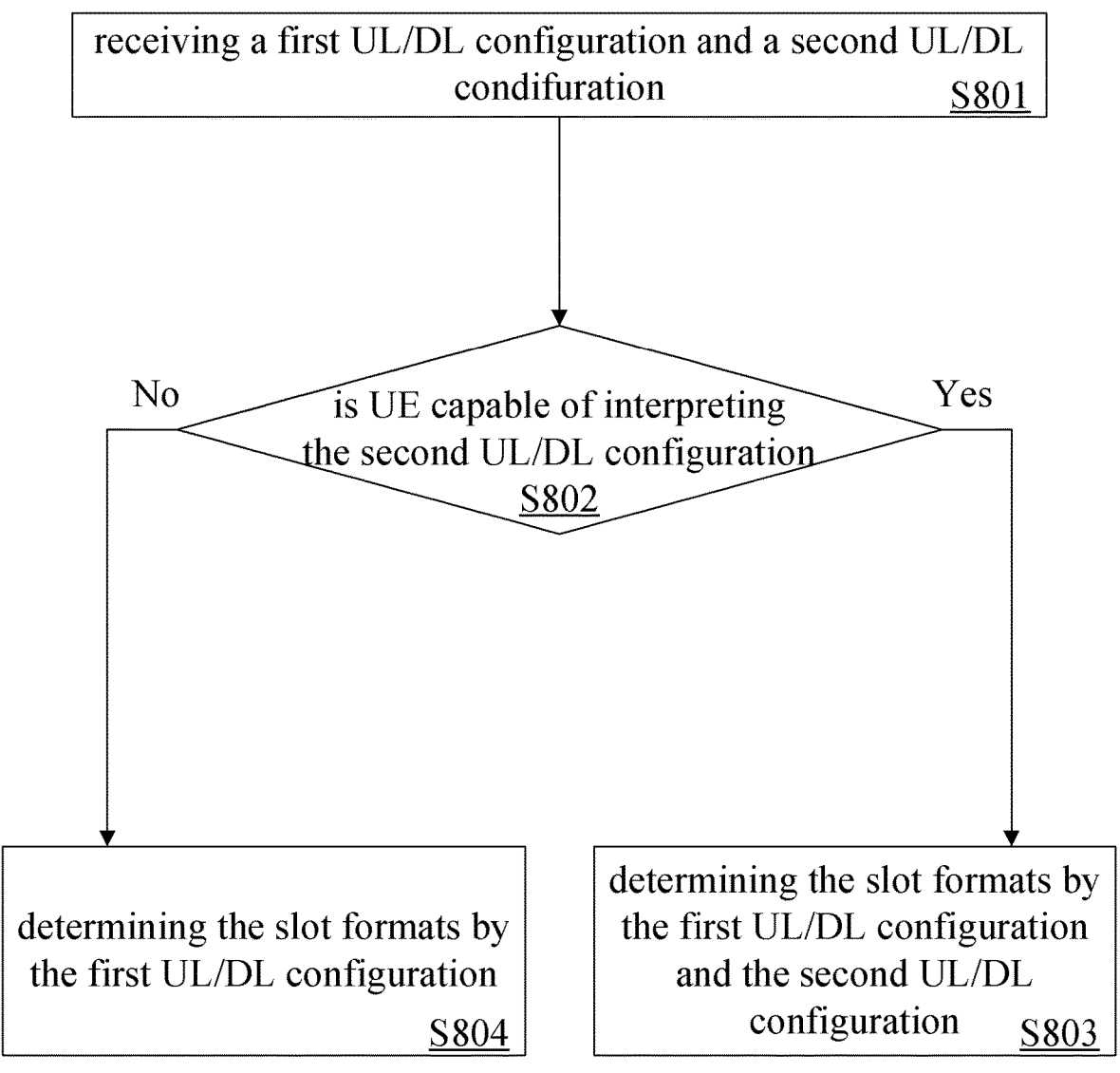
FIG. 8 illustrates a flow chart of a method for wireless communications according to an embodiment of the present disclosure.

FIG. 8 illustrates a flow chart of a method for wireless communications in accordance with some embodiments of the present application. Referring to FIG. 8, method 800 is performed by a UE (e.g., the UE 101) in some embodiments of the present application.

In some embodiments, operation S801 is executed to receive, by the UE, a first UL/DL configuration and a second UL/DL configuration. The first UL/DL configuration may include a cell common UL/DL configuration. The second UL/DL configuration may include another cell common UL/DL configuration.

The first UL/DL configuration and the second UL/DL configuration may have different formats. In detail, the first UL/DL configuration may have a format of the normal cell common UL/DL configuration. The second UL/DL configuration may have a new format based on the normal cell common UL/DL configuration, while the new format indicates a subset of slots/symbols to be changed from DL to UL or flexible, or from UL to DL or flexible.

Operation S802 is executed to determine, by the UE, whether the UE is capable of interpreting the second UL/DL configuration. If it is determined 'yes' in operation S802, Operation S803 is executed to determine, by the UE, the slot formats by the first UL/DL configuration and the second UL/DL configuration. If it is determined 'no' in operation S802, Operation S804 is executed to determine, by the UE, the slot formats by the first UL/DL configuration.

In some embodiments, operation S803 may include two sub-operations: determining the slot formats by the first UL/DL configuration; and changing the slot formats for the set of non-flexible slots and non-flexible symbols by the second UL/DL configuration.

FIG. 9 illustrates a flow chart of a method for wireless communications in accordance with some embodiments of the present application. Referring to FIG. 9, method 900 is performed by a UE (e.g., the UE 101) in some embodiments of the present application.

In some embodiments, operation S901 is executed to receive, by the UE, a first UL/DL configuration and a second UL/DL configuration. Operation S902 is executed to determine, by the UE, slot formats for a set of non-flexible slots and non-flexible symbols by at least one of the first UL/DL configuration and the second UL/DL configuration.

Operation S903 is executed to determine, by the UE, that slot formats of a set of slots and symbols are changed according to the first UL/DL configuration and the second UL/DL configuration. Operation S904 is executed to determine, by the UE, that the set of slots and symbols is utilized as full duplex communication. In some embodiments, operation S904 may include operation of determining that at least one element of the set of slots and symbols is utilized as full duplex communication according to a bitmap configuration.

In some embodiments, the above determined slot formats may be applied after initial access.

Figure 10:
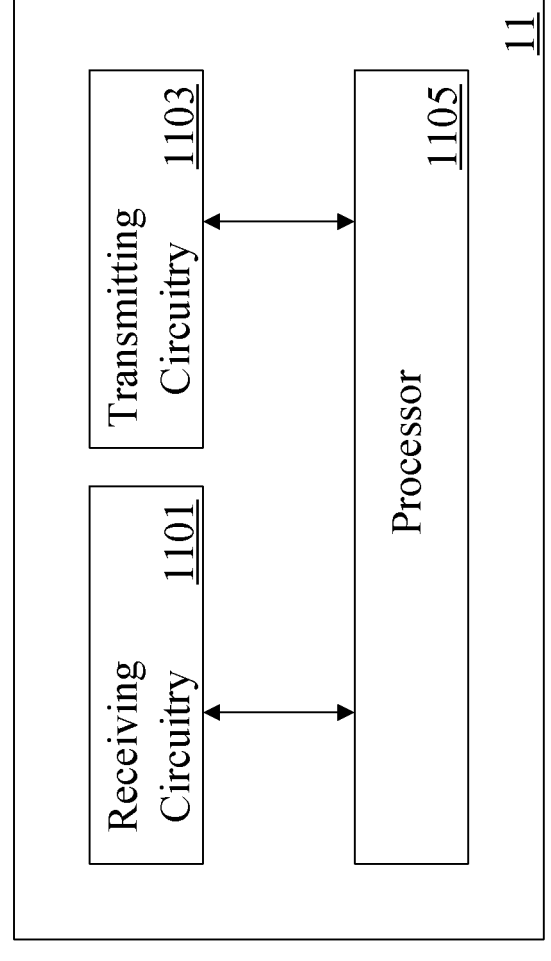
FIG. 10 illustrates a block diagram of an exemplary apparatus in accordance with some embodiments of the present application.

FIG. 10 illustrates an example block diagram of an apparatus 10 according to an embodiment of the present disclosure.

As shown in FIG. 10, the apparatus 11 may include at least one non-transitory computer-readable medium (not illustrated in FIG. 10), a receiving circuitry 1101, a transmitting circuitry 1103, and a processor 1105 coupled to the non-transitory computer-readable medium (not illustrated in FIG. 10), the receiving circuitry 1101 and the transmitting circuitry 1103. The apparatus 11 may be an UE.

Although in this figure, elements such as processor 1105, transmitting circuitry 1103, and receiving circuitry 1101 are described in the singular, the plural is contemplated unless limitation to the singular is explicitly stated. In some embodiments of the present disclosure, the receiving circuitry 1101 and the transmitting circuitry 1103 are combined into a single device, such as a transceiver. In certain embodiments of the present disclosure, the apparatus 11 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 1105 interacting with receiving circuitry 1101 and transmitting circuitry 1103, so as to perform the operations with respect to UE depicted in FIGS. 1 to 4A.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

13

14

We claim:

1. A method performed by a user equipment (UE), the method comprising:

receiving a first uplink and downlink (UL/DL) configuration and a second UL/DL configuration;

determining slot formats for a set of non-flexible slots and non-flexible symbols based on at least one of the first UL/DL configuration and the second UL/DL configuration;

determining that a slot or a symbol is configured as one of downlink, uplink, or flexible in the first UL/DL configuration and is configured differently from another one of downlink, uplink, or flexible in the second UL/DL configuration; and determining that the slot or the symbol is utilized for full-duplex communication based on the slot or the symbol being configured differently in the first UL/DL configuration and the second UL/DL configuration.

2. A user equipment (UE) for wireless communication, comprising:

at least one memory; and at least one processor coupled with the at least one memory and configured to cause the UE to:

receive a first uplink and downlink (UL/DL) configuration and a second UL/DL configuration;

determine slot formats for a set of non-flexible slots and non-flexible symbols based on at least one of the first UL/DL configuration and the second UL/DL configuration;

determine that a slot or a symbol is configured as one of downlink, uplink, or flexible in the first UL/DL configuration and is configured differently from another one of downlink, uplink, or flexible in the second UL/DL configuration; and determine that the slot or the symbol is utilized for full-duplex communication based on the slot or the symbol being configured differently in the first UL/DL configuration and the second UL/DL configuration.

3. The UE of claim 2, wherein the first UL/DL configuration includes a cell common UL/DL configuration and the second UL/DL configuration includes a UE specific UL/DL configuration.

4. The UE of claim 3, wherein the at least one processor is configured to cause the UE to:

receive at least one configuration;

wherein, to determine the slot formats based on the at least one of the first UL/DL configuration and the second UL/DL configuration, the at least one processor is configured to cause the UE to; determine the slot formats based on according to the at least one configuration.

5. The UE of claim 4, wherein to determine the slot formats based on the first UL/DL configuration and the second UL/DL configuration according to the at least one configuration is to:

determine the slot formats based on the first UL/DL configuration; and change the slot formats for the set of non-flexible slots and non-flexible symbols based on the second UL/DL configuration according to the at least one configuration.

6. The UE of claim 3, wherein the at least one processor is configured to cause the UE to:

receive at least one configuration;

wherein, to determine the slot formats based on the at least one of the first UL/DL configuration and the second UL/DL configuration, the at least one processor is configured to cause the UE to; determine the slot formats based on the first UL/DL configuration according to the at least one configuration.

7. The UE of claim 3, wherein the at least one processor is configured to cause the UE to:

receive at least one configuration;

wherein, to determine the slot formats based on the at least one of the first UL/DL configuration and the second UL/DL configuration, the at least one processor is configured to cause the UE to; determine the slot formats based on the first UL/DL configuration when a function associated with the at least one configuration is not enabled.

8. The UE of claim 2, wherein the first UL/DL configuration includes a cell common UL/DL configuration and the second UL/DL configuration includes another cell common UL/DL configuration.

9. The UE of claim 8, wherein the first UL/DL configuration and the second UL/DL configuration have a same format, and wherein, to determine the slot formats based on the at least one of the first UL/DL configuration and the second UL/DL configuration, the at least one processor is configured to cause the UE to; determine the slot formats based on the second UL/DL configuration when a function associated with the second UL/DL configuration is enabled.

10. The UE of claim 9, wherein at least one field of the second UL/DL configuration is different from a corresponding field of the first UL/DL configuration.

11. The UE of claim 8, wherein, to determine the slot formats based on the at least one of the first UL/DL configuration and the second UL/DL configuration, the at least one processor is further configured to cause the UE to:

determine the slot formats by the first UL/DL configuration; and change the slot formats for the set of non-flexible slots and non-flexible symbols by the second UL/DL configuration when a function associated with the second UL/DL configuration is enabled.

12. The UE of claim 8, wherein, to determine the slot formats based on the at least one of the first UL/DL configuration and the second UL/DL configuration, the at least one processor is further configured to cause the UE to:

determine the slot formats based on the first UL/DL configuration when a function associated with the second UL/DL configuration is not enabled.

13. The UE of claim 2, wherein the at least one processor is configured to cause the UE to:

determine that whether a set of slots and symbols is configured as one of downlink, uplink, or flexible is changed according to the first UL/DL configuration and the second UL/DL configuration; and determine that the set of slots and symbols is utilized for full duplex communication.

14. The UE of claim 13, wherein, to determine that the set of slots and symbols is utilized for the full duplex communication, the at least one processor is further configured to cause the UE to:

determine that at least one element of the set of slots and symbols is utilized for the full duplex communication according to a bitmap configuration.

15. The UE of claim 2, wherein the at least one processor is configured to cause the UE to apply the slot formats during an initial network access.

16. A processor for wireless communication, comprising:

at least one controller coupled with at least one memory and configured to cause the processor to:

receive a first uplink and downlink (UL/DL) configu-
ration and a second UL/DL configuration;
determine slot formats for a set of non-flexible slots and
non-flexible symbols based on at least one of the first
UL/DL configuration and the second UL/DL con-
figuration;
determine that a slot or a symbol is configured as one
of downlink, uplink, or flexible in the first UL/DL
configuration and is configured differently from
another one of downlink, uplink, or flexible in the
second UL/DL configuration; and
determine that the slot or the symbol is utilized for
full-duplex communication based on the slot or the
symbol being configured differently in the first
UL/DL configuration and the second UL/DL con-
figuration.

17. The processor of claim 16, wherein the first UL/DL
configuration includes a cell common UL/DL configuration
and the second UL/DL configuration includes a UL/DL
configuration specific to a user equipment (UE) that includes
the processor.

18. The processor of claim 17, wherein the at least one
controller is configured to cause the processor to:

receive at least one configuration;
wherein, to determine the slot formats based on the at
least one of the first UL/DL configuration and the
second UL/DL configuration, the at least one controller
is configured to cause the processor to; determine the
slot formats based on the first UL/DL configuration
according to the at least one configuration.

19. The processor of claim 17, wherein the at least one
controller is configured to cause the processor to:
receive at least one configuration;
wherein to determine the slot formats based on the at least
one of the first UL/DL configuration and the second
UL/DL configuration, the at least one controller is
configured to cause the processor to; determine the slot
formats based on the first UL/DL configuration when a
function associated with the at least one configuration
is not enabled.

20. The processor of claim 16, wherein the first UL/DL
configuration includes a cell common UL/DL configuration
and the second UL/DL configuration includes another cell
common UL/DL configuration.

* * * * *